United States Patent
Coombes et al.

(10) Patent No.: US 10,021,758 B2
(45) Date of Patent: Jul. 10, 2018

(54) SENSOR BOARD FOR LUMINAIRE/LIGHTING SYSTEM

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/847,602

(22) Filed: Dec. 19, 2017

(65) Prior Publication Data

US 2018/0110109 A1 Apr. 19, 2018

Related U.S. Application Data

(63) Continuation-in-part of application No. 15/785,808, filed on Oct. 17, 2017, and a continuation of (Continued)

(51) Int. Cl.
*H04N 9/68* (2006.01)
*G06F 3/033* (2013.01)
(Continued)

(52) U.S. Cl.
CPC ......... *H05B 33/0893* (2013.01); *H04L 67/10* (2013.01); *H04W 4/06* (2013.01);
(Continued)

(58) Field of Classification Search
CPC ............... G09G 3/3688; G09G 3/3648; G09G 2330/021; G09G 2310/027; G09G 5/006;
(Continued)

(56) References Cited

U.S. PATENT DOCUMENTS 3,971,065 A 7/1976 Bayer
4,245,241 A 1/1981 Sato et al.
(Continued)

FOREIGN PATENT DOCUMENTS

CA 1315331 C 3/1993
CA 2594246 A1 1/2008
(Continued)

OTHER PUBLICATIONS

Lighting Research Center, Assist: Alliance for Solid-State Illumination Systems and Technologies, Feb. 15, 2005, 2 pages, http://www.lrc.rpi.edu/programs/solidstate/assist/index.asp.
(Continued)

*Primary Examiner* — Minh D A
(74) *Attorney, Agent, or Firm* — Moyles IP, LLC (57) ABSTRACT

According to some embodiments, a sensor board may be used with a luminaire. The sensor board may include an environment sensor disposed on a first side of the sensor board to function in a first direction and a color sensor disposed on a second side of the sensor board to function in a second direction. The environment sensor may include an adjustable lens assembly. The environment sensor and the color sensor may be oriented 180° apart from each on the sensor board and the first direction may be oriented 180° apart from the second direction.

20 Claims, 10 Drawing Sheets

Related U.S. Application Data application No. 15/424,868, filed on Feb. 5, 2017, and a continuation-in-part of application No. 15/360,879, filed on Nov. 23, 2016, now Pat. No. 9,655,197, and a continuation-in-part of application No. 15/643,244, filed on Jul. 6, 2017, and a continuation-in-part of application No. 15/592,400, filed on May 11, 2017, and a continuation-in-part of application No. 15/586,745, filed on May 4, 2017, now Pat. No. 9,874,478, and a continuation of application No. 29/569,839, filed on Jun. 30, 2016, now Pat. No. Des. 808,826, and a continuation of application No. 29/585,592, filed on Nov. 28, 2016, and a continuation-in-part of application No. 29/585,444, filed on Nov. 23, 2016.

(60) Provisional application No. 62/521,817, filed on Jun. 19, 2017, provisional application No. 62/510,739, filed on May 24, 2017, provisional application No. 62/445,669, filed on Jan. 12, 2017, provisional application No. 62/306,636, filed on Mar. 11, 2016, provisional application No. 62/420,908, filed on Nov. 11, 2016, provisional application No. 62/492,849, filed on May 1, 2017, provisional application No. 62/397,683, filed on Sep. 21, 2016, provisional application No. 62/490,388, filed on Apr. 26, 2017, provisional application No. 62/580,912, filed on Nov. 2, 2017.

(51) Int. Cl.
*H05B 33/08* (2006.01)
*H04W 4/06* (2009.01)
*H04L 29/08* (2006.01)
*H05B 37/02* (2006.01)
*H04W 4/02* (2018.01)

(52) U.S. Cl.
CPC ..... *H05B 33/0845* (2013.01); *H05B 33/0851* (2013.01); *H05B 33/0866* (2013.01); *H05B 37/0254* (2013.01); *H04W 4/023* (2013.01)

(58) Field of Classification Search
CPC ......... G09G 2300/0842; G09G 3/3233; G09G 2300/0426; G09G 2300/0809; G06F 3/016; G06F 3/011; G06F 3/038; G06F 3/03543; G06F 3/0338; G06F 1/169; G06F 3/0362; G06F 3/0346; G06F 3/0304; G06F 3/017; G06F 1/1626; G06F 3/04847; G06F 3/04892; H01H 2221/012
See application file for complete search history.

(56) References Cited

U.S. PATENT DOCUMENTS

| | | |
|---|---|---|
| D274,297 S | 6/1984 | Wright |
| 4,894,601 A | 1/1990 | Watkins |
| 4,945,280 A | 7/1990 | Beghelli |
| 5,154,504 A | 10/1992 | Helal et al. |
| D331,203 S | 11/1992 | Collister |
| D346,791 S | 5/1994 | Marach et al. |
| 5,770,928 A | 6/1998 | Chansky et al. |
| 5,991,048 A | 11/1999 | Karlson et al. |
| D431,198 S | 9/2000 | Monaco et al. |
| 6,538,568 B2 | 3/2003 | Conley, III |
| 7,045,964 B1 | 5/2006 | Hermans |
| 7,248,297 B2 | 7/2007 | Catrysse et al. |
| 7,527,437 B2 | 5/2009 | Santos et al. |
| D618,332 S | 6/2010 | Kimura et al. |
| 7,777,427 B2 | 8/2010 | Stalker, III |
| D627,503 S | 11/2010 | Postelmans |
| 7,862,202 B2 | 1/2011 | Laso et al. |
| 7,893,632 B2 | 2/2011 | Meijer et al. |
| 7,950,832 B2 | 5/2011 | Tanaka et al. |
| D664,877 S | 8/2012 | Krumpe et al. |
| 8,319,452 B1 | 11/2012 | Hamel et al. |
| D672,264 S | 12/2012 | Ochoa |
| 8,442,785 B2 | 5/2013 | Walters et al. |
| D695,592 S | 12/2013 | White |
| 8,636,385 B2 | 1/2014 | Fabbri et al. |
| 8,643,304 B2 | 2/2014 | Hamel et al. |
| 8,729,834 B1 | 5/2014 | Funderburk et al. |
| 8,928,232 B2 | 1/2015 | Aggarwal et al. |
| 9,046,244 B2 | 6/2015 | Yang |
| 9,084,308 B2 | 7/2015 | Morrow |
| 9,131,581 B1 | 9/2015 | Hsia et al. |
| 9,148,936 B2 | 9/2015 | Wagner et al. |
| D742,334 S | 11/2015 | Pratt et al. |
| 9,277,632 B2 | 3/2016 | Hegarty |
| 9,288,877 B2 | 3/2016 | Pratt et al. |
| D757,344 S | 5/2016 | Reynolds |
| 9,332,610 B2 | 5/2016 | Kuo et al. |
| D762,583 S | 8/2016 | Dick |
| 9,408,280 B2 | 8/2016 | Schröder et al. |
| D772,693 S | 11/2016 | Beadle |
| D775,410 S | 12/2016 | Klus |
| 9,521,733 B2 | 12/2016 | Brand et al. |
| D775,512 S | 1/2017 | White |
| 9,655,197 B1 | 5/2017 | Coombes et al. |
| 2006/0049935 A1 | 3/2006 | Giannopoulos et al. |
| 2008/0204437 A1 | 8/2008 | Jensen |
| 2008/0218334 A1 | 9/2008 | Pitchers et al. |
| 2008/0309259 A1 | 12/2008 | Snijder et al. |
| 2010/0020550 A1 | 1/2010 | Kawashima et al. |
| 2011/0122796 A1 | 5/2011 | Simons et al. |
| 2011/0233392 A1 | 9/2011 | Amante |
| 2012/0139417 A1 | 6/2012 | Mironichev et al. |
| 2013/0181636 A1 | 7/2013 | Agrawal |
| 2013/0193876 A1 | 8/2013 | Cleland et al. |
| 2013/0221858 A1 | 8/2013 | Silberstein |
| 2014/0086590 A1 | 3/2014 | Ganick et al. |
| 2014/0097758 A1 | 4/2014 | Recker et al. |
| 2014/0320022 A1 | 10/2014 | Lee |
| 2014/0336821 A1 | 11/2014 | Blaine et al. |
| 2014/0375221 A1 | 12/2014 | Mans et al. |
| 2015/0130365 A1 | 5/2015 | Kim et al. |
| 2015/0338077 A1 | 11/2015 | Johnson |
| 2016/0014867 A1 | 1/2016 | Luk |
| 2016/0036268 A1 | 2/2016 | Laherty et al. |
| 2016/0088711 A1 | 3/2016 | Ng et al. |
| 2016/0302273 A1 | 10/2016 | Wee et al. |
| 2016/0360594 A1 | 12/2016 | Chemel |
| 2016/0366752 A1 | 12/2016 | Di Censo et al. |
| 2017/0245352 A1 | 8/2017 | Van Der Brug |
| 2017/0270342 A1* | 9/2017 | He .......... G06F 3/0412 |
| 2017/0330007 A1* | 11/2017 | Lu ............ G06K 7/10831 |

FOREIGN PATENT DOCUMENTS

| | | |
|---|---|---|
| CN | 2349441 Y | 11/1999 |
| CN | 2356211 Y | 12/1999 |
| CN | 203104909 U | 7/2013 |
| DE | 202004004459 U1 | 8/2004 |
| DE | 102012210743 A1 | 1/2014 |
| EP | 0940904 A2 | 9/1999 |
| EP | 1035628 A1 | 9/2000 |
| EP | 1043826 A2 | 10/2000 |
| EP | 2242333 A1 | 10/2010 |
| GB | 2380620 A | 4/2003 |
| GB | 2494151 A | 3/2013 |
| JP | 2003086019 A | 3/2003 |
| WO | WO-2009104135 A1 | 8/2009 |
| WO | WO-2012131631 A1 | 10/2012 |
| WO | WO-2015177762 A2 | 11/2015 |
| WO | WO-2016003672 A1 | 1/2016 |

(56) References Cited

FOREIGN PATENT DOCUMENTS

| WO | WO-2016039690 A1 | 3/2016 |
| WO | WO-2016054413 A1 | 4/2016 |

OTHER PUBLICATIONS

U.S. Department of Energy, LED Measurement Series: LED Luminaire Reliability, Oct. 2009, 4 pages, www.ssl.energy.gov.

Philips, Understanding power LED Lifetime analysis, Technology White Paper, Dec. 5, 2016, 11 pages, www.lrc.rpi.edu/programs/solidstate/assist/index.asp.

Kevin Dowling, PhD, Lumen Maintenance IESNA LM-80-2008, Oct. 30, 2008, 16 pages, www1.eere.energy.gov/buildings/publications/pdfs/ssl/lm80-webcast_10-30-08.pdf.

Jeff McCullough, LC, Pacific NW National Lab, Energy Star® Webinar:Requirements for Lumen Maintenance, Oct. 30, 2008, 18 pages, www1.eere.energy.gov/buildings/publications/pdf.

M-Cam Patently Obvious, Kodak's Final Gasp? Intellectual Property Analysis of Kodak v Apple, HTC, Jan. 13, 2012, 8 pages, http://www.globalinnovationcommons.org.

Claire Swedberg, IoT Lights Up Streets With Smart City Initiative, RFiD Journal, Jul. 23, 2015, 3 pages, http://www.iotjournal.com/articles/view?13303.

DALI, Discover DALI—Excellent System Performance, Mar. 31, 2014, 5 pages, http://dali-ag.org/discover-dali.html.

International Search Report & Written Opinion of Inter. App. No. PCT/IB2017/051390,which is in the same family as U.S. Appl. No. 15/424,868, dated Mar. 17, 2017, 13 pages.

alibaba.com, PDP Kinect TV Mount—Xbox One, 3 pgs., https://guide.alibaba.com/shop/pdp-kinect-tv-mount-xbox-one_3162680.html.

Double Radius, Ubiquiti Current Sensor, Clip-On Alternating Current, 2 pgs, http://www.doubleradius.com/Manufacturers/mFi-1/Ubiquiti-Current-Sensor-mFi-CS.html.

* cited by examiner

FIG. 10

SENSOR BOARD FOR LUMINAIRE/LIGHTING SYSTEM

CROSS REFERENCE TO RELATED APPLICATIONS

This application is a continuation-in-part of and claims priority to U.S. patent application Ser. No. 15/785,808, filed Oct. 17, 2017, which claims the benefit of U.S. Provisional Patent Application No. 62/510,739 filed May 24, 2017 and is a continuation-in-part of and claims priority to U.S. patent application Ser. No. 15/424,868 filed Feb. 5, 2017, which claims the benefit of U.S. Provisional Patent Application No. 62/445,669 filed Jan. 12, 2017 and is a continuation-in-part of and claims priority to U.S. patent application Ser. No. 15/360,879 filed Nov. 23, 2016, now U.S. Pat. No. 9,655,197, which claims the benefit of U.S. Provisional Patent Application No. 62/306,636 filed Mar. 11, 2016. This application is a continuation-in-part of and claims priority to U.S. patent application Ser. No. 15/586,745, filed May 4, 2017, which claims priority to U.S. patent application Ser. No. 29/569,839, filed Jun. 30, 2016 and the benefit of U.S. patent application Ser. No. 62/490,388, filed Apr. 26, 2017. This application is a continuation-in-part of and claims priority to U.S. patent application Ser. No. 29/585,444, filed Nov. 23, 2016. This application is a continuation-in-part of U.S. patent application Ser. No. 29/585,592, filed Nov. 28, 2016. This application is a continuation-in-part of U.S. patent application Ser. No. 15/592,400, filed May 11, 2017, which claims the benefit of U.S. Provisional Application No. 62/397,683 filed Sep. 21, 2016. This application is a continuation-in-part of and claims priority to U.S. patent application Ser. No. 15/643,244, filed Jul. 6, 2017, which claims the benefit of U.S. Provisional Patent Application No. 62/492,849, filed May 1, 2017. This application claims the benefit of U.S. Provisional Patent Application No. 62/521,817 filed Jun. 19, 2017 and U.S. Provisional Patent Application No. 62/580,912 filed Nov. 2, 2017. The disclosures of all of the applications listed above are incorporated herein by reference in their entireties.

FIELD OF THE DISCLOSURE

As described herein, a sensor board for a lighting system that includes multiple sensors affixed to the sensor board.

BACKGROUND OF THE DISCLOSURE

A lighting system may provide illumination that is based on time (e.g., when a user is present) and may be based on location (e.g., lighting a particular area in which a user is interested in occupying or intends to occupy). For example, the lighting system may primarily light an area of a room where a user is located or an area that a user has selected to occupy. Such targeted lighting may be advantageous because it can greatly reduce power consumption compared to conventional lighting systems.

Many lighting system or luminaires employ light-emitting diodes (LEDs) for at least some of the lighting. LEDs are advantageous because they are generally more energy efficient than incandescent or fluorescent lights. A lighting system may include one or more LED lights, one or more fluorescent lights, one or more incandescent lights and a sensor unit. The sensor unit receives light from a light source based on a type of sensor being used and the sensor unit may be affected by false ambient light readings. Accordingly, there is a need for a sensor unit for a luminaire to help eliminate false ambient light readings.

BRIEF DESCRIPTION OF THE EXEMPLARY EMBODIMENTS

The present embodiments relates to a sensor board for a luminaire/lighting system. The sensor board may include an environment sensor disposed on a first side of the sensor board to function in a first direction and a color sensor disposed on a second side of the sensor board to function in a second direction. The environment sensor and the color sensor may be oriented 180° apart from each on the sensor board. Furthermore, the first direction may be oriented 180° apart from the second direction.

Furthermore, the present embodiments may relate to a sensor board for use with a luminaire where the sensor board includes a camera disposed on a first side of the sensor board and facing away from a luminaire. The sensor board may further include a color sensor disposed on a second side of the sensor board to face towards the luminaire. The camera and the color sensor may be oriented 180° apart from each on the sensor board and a direction of the camera may be oriented 180° apart from a direction of the color sensor. These and other advantages will be apparent from the present application of the embodiments described herein.

BRIEF DESCRIPTION OF THE DRAWINGS

The above and still further features and advantages of the embodiments of the present disclosure will become apparent upon consideration of the following detailed description of embodiments thereof, especially when taken in conjunction with the accompanying drawings, and wherein.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION OF THE EXEMPLARY EMBODIMENTS

The term "module" as used herein refers to any known or later developed hardware, software, firmware, artificial intelligence, fuzzy logic, or combination of hardware and software that is capable of performing the functionality associated with that element. In some embodiments, a sensor board may include a variety of lens caps and may be compatible for use with either surface-mount or through-hole luminaires. The sensor board may include various body types, such as flexible body types or rigid body types. Both rigid and flexible sensor boards may come in single or multi-unit configurations.

The sensor board described herein may be manufactured in different shapes and sizes, such as, for example, cylindrical (wherein the cross-section is oval), rectangular (wherein the cross-section is square), and conical (wherein the cross-section increases in size from the entrance end to exit end). The sensor board may also include specialized/irregular shapes, such as, an arrow, a star, a quarter moon, etc. A sensor board shape may gradually change along its length. For example, the sensor board may include a substantially circular shape at an entrance end to accommodate the luminaire, and may include a square shape at its exit end. The sides of the sensor board that are parallel to the direction of light travel may affect internal reflection and refraction within the luminaire and thus, an upper or top portion of the sensor board may be contoured to match the luminaire in order to allow light rays to enter with minimal reflection and refraction, while the rear portion of the sensor board, in some embodiments, may be hidden 100% away from the lighting system.

For purposes of illustrating features of the embodiments, various configurations of the embodiments will now be introduced and referenced throughout the disclosure. Those skilled in the art will recognize that these configurations are illustrative and not limiting and are provided purely for explanatory purposes.

Figure 1:
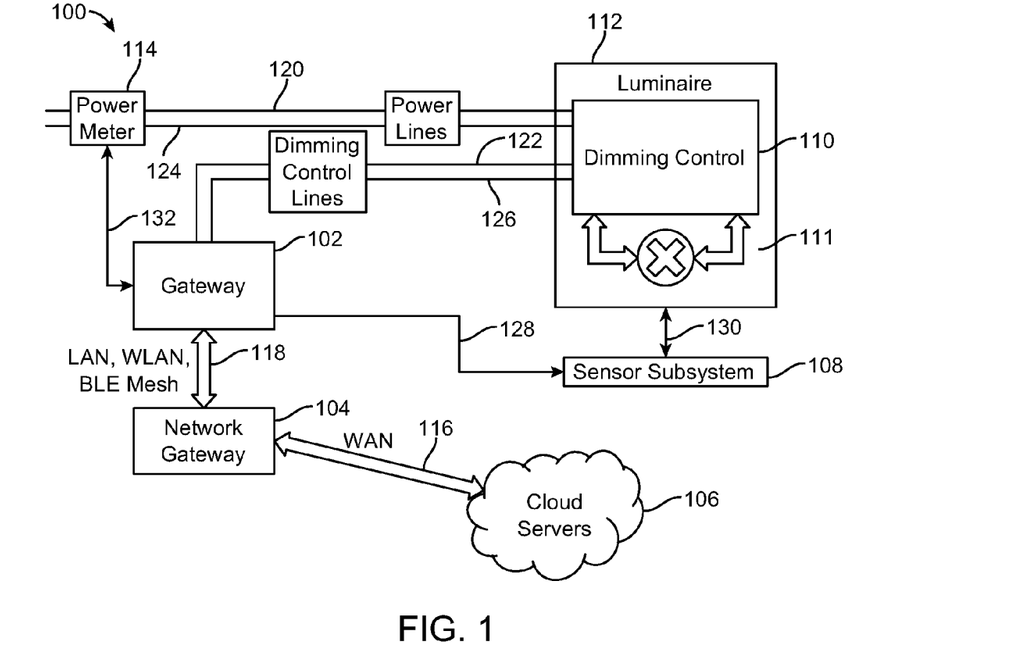
FIG. 1 is a high-level diagram of a system, according to some embodiments.

Now referring to FIG. 1, an illustrative embodiment of a system 100 for transporting high luminous intensity lights coming out of a plurality of luminaires 112 is illustrated. Each luminaire may include a dimming control mechanism 110 that is controlled by a switch 111. According to some embodiments, a luminaire 112 may be located at a certain distance from a sensor board or printed circuit board (PCB) (as described in greater detail below). In some embodiments, a standalone PCB may include at least one sensor that is capable of sensing a plurality of information. The standalone PCB may be physically connected to a gateway 102 and may transmit information collected by the at least one sensor towards the gateway 102 for further processing.

According to some embodiments, the standalone PCB may be attachable anywhere in an environment where the luminaire 112 is located. In one embodiment, the standalone PCB may be part of a sensor clip that is attachable to the luminaire 112, or a panel in a ceiling, or to other devices in the environment in which the luminaire 112 is located. The standalone PCB may include one upward looking sensor (GSC2) and one downward looking sensor (GSC1), which are placed substantially back to back to each other, as described in greater detail below. In some embodiments, the upward-looking sensor (GSC2) may sense light coming from the luminaire 112, while the downward looking sensor (GSC1) may sense the environment proximate to the luminaire 112. The standalone PCB may be physically connected to the gateway 102 via a sensor communication cable.

According to some embodiments, the luminaire 112 may be arranged such that it is collocated with the standalone PCB, separated from or attached to the standalone PCB, or located at a set distance from the PCB. According to some embodiments, the system 100 may carry the high luminous intensity lights towards a destination area/environment with minimal loss of the lights. According to some embodiments, the system 100 may include a gateway (e.g., a universal smart lighting gateway) 102 arranged in the environment. The system 100 may further include a luminaire 112. In some embodiments, the luminaire 112 may include a single luminaire system having one luminaire 112 or may include a multiple luminaire system having at least two luminaires 112. According to some embodiments, the luminaire 112 may be connected to power lines 120, 124 and dimming control lines 122, 126. In some embodiments, the connection to the power lines 120, 124 and the dimming control lines 122, 126 may be via a single common interface. According to some embodiments, a power meter 114 may be electrically connected to, and positioned between, the gateway 102 and the luminaire 112 on the power lines 120, 124. According to some embodiments, the power meter 114 may be connected to the gateway 102 via a power meter interface 132.

According to some embodiments, the power meter 114 may include a sensor subsystem 108 (e.g., a sensor clip subsystem) that may be coupled to the luminaire 112 on a first side of the luminaire 112 and the luminaire may be coupled to the gateway 102 on a second side of the luminaire 112 (e.g., an opposing side to the first side). In some embodiments, a connection 130 may be provided to connect the sensor subsystem 108 directly the gateway 102 and the luminaire 112. The connection 130 to the luminaire 112 may be a physical connection and the connection 130 may not be limited to a specific location on the luminaire. The location of the sensor subsystem 108 may be different for various types of sensors and luminaires. The gateway 102 may include a backhaul interface 118 associated with a wired or a wireless Local Area Network (LAN), including one or more of Mesh Bluetooth Low Energy (Mesh BLE), WLAN, ZigBee, and/or Ethernet LAN. In an embodiment, the backhaul interface 118 may include an interface associated with a Mesh BLE. According to some embodiments, the gateway 102 may be connected with a network gateway 104, which may be disposed between local networks and a wide area network (WAN) 116, and the WAN 116 may communicate to cloud based servers 106. In some embodiments, the system 100 may further include a dynamic discovery mechanism associated with a dimming protocol that runs over the dimming control lines 122, 126.

Figure 2:
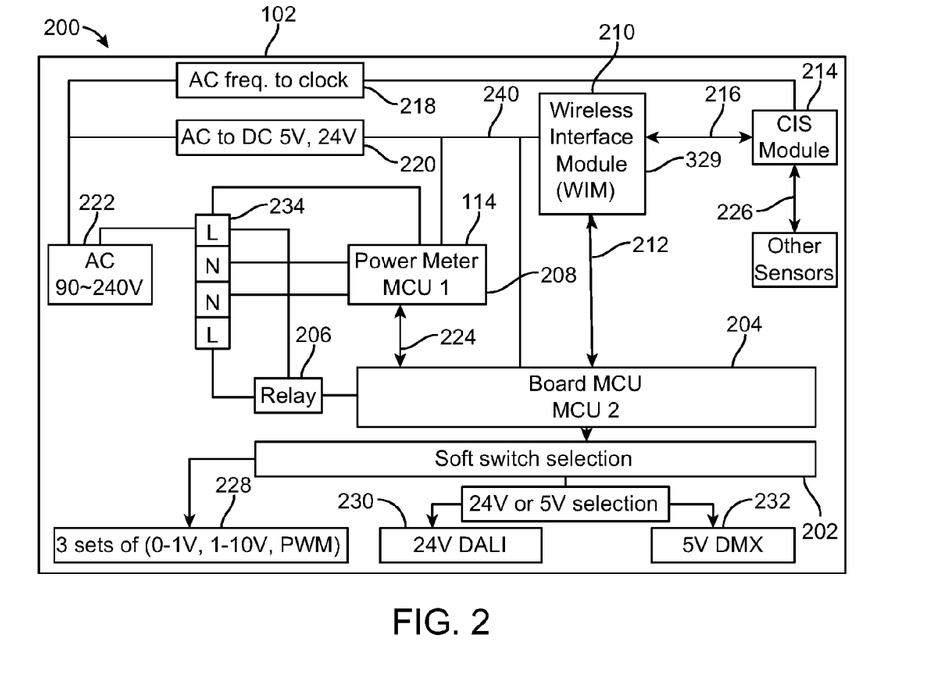
FIG. 2 is a diagram of a system, illustrating a power meter connection, according to some embodiments.

Referring now to FIG. 2, a system 200 that includes a Universal Smart Lighting Gateway 102, a sensor subsystem module 214 and sensor communication 216 is illustrated. According to some embodiments, the sensor subsystem module 214 may be encapsulated within a sensor clip (not shown). In FIG. 2 and according to some embodiments, the system 200 may include a soft switch 202 to select between different electrical dimming interfaces. This soft switch 202 may be actively used in a search for a correct protocol between the gateway 102 and a dimming luminaire 112 (not shown in this figure).

In some embodiments, the system 200 may include a dimming control mechanism performed via a hard switch (not shown in this figure). Protocol modules 228, 230, and 232 may be used in a software implementation of the dimming interfaces that reside in the gateway 102. In some embodiments, the supported dimming protocol may include several sets of protocols 0V-10V, 1V-10V, Pulse Width Modulation (PWM) 228 over 0V-10V and/or 1V to 10V, a 24V Digital Addressable Lighting Interface (DALI®) 230 protocol, and a 5V Digital Multiplex (DMX) 232 protocol. The protocols may include algorithms, which may be implemented in a Micro Controller Unit 2 (MCU-2) 204. The MCU-2 204 may be powered by the AC to DC 5V, 24V 220 via a power line connection 240. According to some embodiments, the MCU-2 204 may also be connected to a power meter 114 via a Micro Controller Unit 1 (MCU-1) and Universal Asynchronous Receiver/Transmitter (UART) 224. The MCU-2 204 may also be connected to a relay 206. MCU-2 204 may also be connected to a Wireless Interface Module (WIM) 210 via a Serial Peripheral Interface (SPI) bus 212. The WIM 210 may include a wireless interface module between a network and the sensor system and the luminaire. In some embodiments, the MCU-2 204 may also control the relay 206 that is designed to be able to cut off the current to the luminaire 112 upon a decision by the MCU-2 204. The power cutoff may be used to disconnect power from a controlled luminaire subsystem and, in some embodiments, the Wireless Interface Module (WIM) 210 may be implemented as a Bluetooth Low Power (BLE) device using a Mesh BLE protocol to connect with other devices as well having SPI bus 212 and Inter-Integrated Circuit two-wire serial interface bus ("TWSI") 216.

The WIM 210 may be connected to a Camera Interface System (CIS) 214, which may include an environment sensor (e.g., a camera) and an RGB sensor. The CIS module 214 may be extended via a Two-Wire Serial Interface ("TWSI") bus 226 with other sensor modules. The CIS module 214 may utilize a clock, which may be received via an AC Frequency to clock module interface 218. According to some embodiments, the WIM 210 may be powered via the AC to DC 5V to 24V 220 via power interface line 240. The AC Power 90V-240V 222 may be relayed to the MCU-2 204 and from it to the soft switch 202 for power selection for the dimming protocol interfaces. The AC Power may additionally be relayed to the power meter 114 which measures all power delivered to the luminaire 112. According to some embodiments, the LNNL 234 may include the physical electrical line connections.

The power meter 114 may be connected to an input line of the luminaire 112 (as shown in FIG. 1) so that the power meter 114 measures, in real-time, electrical power drawn by the luminaire 112. According to some embodiments, the power meter 114 may be coupled to the gateway 102 to provide real time power measurements. The interface 132, between the gateway 102 and the power meter 114, may be a Universal Asynchronous Receiver/Transmitter (UART) or any other communication interface ("power meter interface"). The interface 120, 124 between the power meter device 114 and the luminaire 112 may depend on a type of power meter 114 being used.

Figure 3:
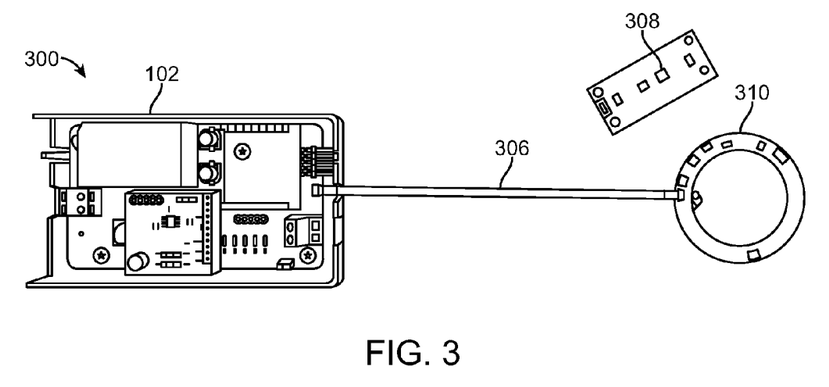
FIG. 3 is a perspective view of a system, illustrating a sensor connection to a luminaire, according to some embodiments.

According some embodiments, and as illustrated in FIG. 3, a system 300 may include one or more sensors 308, 310, typically configured as CIS modules, that are connected to the gateway 102. FIG. 3 illustrates an embodiment that includes at least one of a first CIS module 308 and a second CIS module 310. While only one connection is actually depicted, it would be understood by one of ordinary skill in the art that one or both of the sensors 308, 310 can be connected to the gateway 102. According to some embodiments, the CIS modules 308, 310 may include a physical interface 306 with the gateway 102 via a Two-Wire Serial Interface (TWSI) connection that uses a 6 or 8 pin flexible printed circuit (FPC) cable and connector. The CIS modules 308, 310 may be physically connected at any desired position on a luminaire 112 (not shown in FIG. 3). According to some embodiments, the CIS module 308 may include a linear module that can be adopted to fit on a luminaire 112 requiring a linear fitting. In some embodiments, the CIS module 310 may be circular and may be designed to fit circular-shaped luminaires 112.

In some embodiments, each of the CIS 308 and CIS 310 sensors may include at least two sensors (not shown in FIG. 3). A first sensor (e.g., "environment sensor(s)") may be dedicated to environment sensing, and may be arranged such that it faces away from and/or extends in a downwardly fashion, from the luminaire 112. According to some embodiments, a second sensor (e.g., a "color sensor"/"RGB sensor") may be arranged such that it faces the luminaire 112 directly. The first sensor may be named the environment sensor or GSC1 and the second sensor may be named the RGB/color sensor or GSC2. The combination of the two or more sensors, namely the environment sensors and the RGB sensors, may be combined into a single Application Specific Integrated Circuit (ASIC) or may be arranged as a set of separate devices. According to some embodiments, the first and second sensors of the CIS 308 and CIS 310 modules may also connect with the gateway 102. Both sensors may provide real time measurements and assessments to the gateway 102. In response to the measurements and assessments provided, the gateway 102 may control the dimming device 110 and may change the dimming level and a color temperature and RGB/RGBW (Red Green Blue Warm White) color, in devices that allow for color temperature and RGB/RGBW color control.

According to some embodiments, the system 100 may include the RGB sensor directly facing a luminaire (not shown in FIG. 3). The RGB sensor may measure both the RGB content of a light source and the color/RGB intensity of the light source. According to some embodiments, the RGB sensor or combination of sensors may be configured to measure multiple color channels since the RGB sensor or combination of sensors may directly face the luminaire.

According to some embodiments, the first set of sensors may include magnetometer 3D sensor to sense, in real time, and maintain a correct orientation of every IoT device installed in each luminaire. In some aspects, the first set of sensors may face away from and/or extend in a downwardly fashion, from the luminaire to track objects in real time.

According to some embodiments, the first set of sensors may face away from and/or extend in a downwardly fashion, from the luminaire 112 to determine optical flow in images based on the Lucas-Kanade method. The general optical flow for an image using the Lucas-Kanade method may include a calculation using two images only: the current image and the previous image. For the current image the difference to the previous image may be calculated by a difference of the pixel values. The pixel difference may be calculated for each of the pixels in the image and an estimate of the direction of the change in pixel value may be calculated using neighboring pixels. The movement direction of each pixel may be summarized by yielding a total movement direction for the image. In some embodiments, a result of the movement calculation may be a flow of the complete image, not a flow of individual objects in the image. It is an underlying prerequisite for this method that an image frame rate is high enough to ensure that the contents of a pixel has not moved beyond the neighboring pixels; in other words, that a value change of a pixel has been relocated to its neighbors. Movement may be calculated as a flow of the pixels in an image that has changed more than a threshold limit. A resulting movement vector may be scaled dynamically to be represented by two signed bytes (one for x-direction and one for y-direction). This may indicate that a speed of the flow in the image may not be available. A movement detection interrupt may not be issued unless three consecutive images show movement. The resulting vector may include an average of the three movement vectors. The number of vectors before movement detected is issued may be configured. The multiple sensors and velocity vectors may be tuned up based on feedback provided by the system such as, for example, a distance between the sensors during lighting installation.

An environment sensor may include a low resolution imaging sensor, such as an array of sensors combined into a low resolution imaging device, or a single ASIC that is an imaging sensor. According to some embodiments, the environment sensor may measure environmental parameters and may be facing away from the luminaries 112. The environment sensor may be arranged to monitor the environment of the light source. According to some embodiments, the down looking environment sensor may include a low-resolution image sensor, an ambient light sensor, orientation sensor, movement detection sensor and a temperature sensor. In some embodiments, the environment sensor may include a plurality of environment sensors. In other words, the environment sensor may include less or more sensors than described herein. Embodiments in accordance with the present disclosure may use other sensors and more types of sensors to sense the environment. According to some embodiments, the environment sensor may include a single sensor ASIC. The environment sensor may include any sensor that is capable of collecting information to measure the environment, including ambient light and temperature. In some embodiments, the environment sensor may include a camera.

Figure 4:
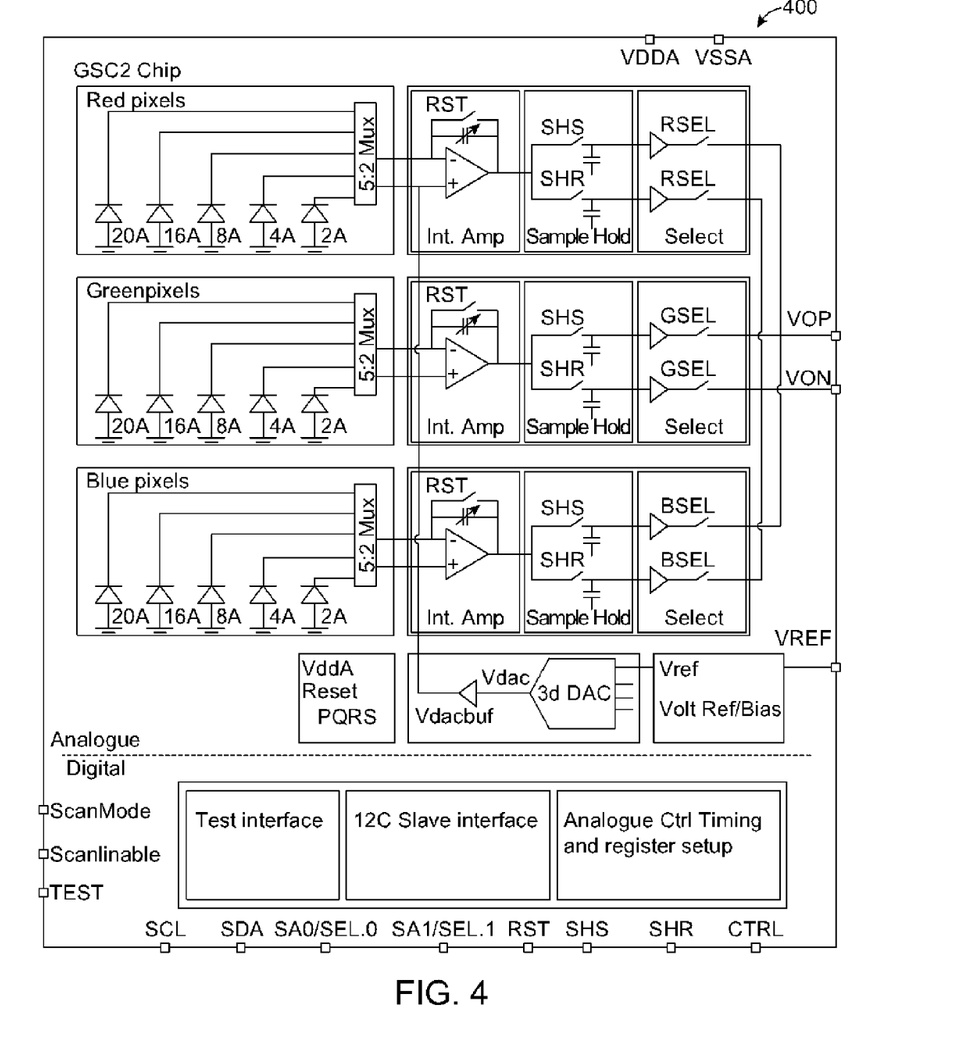
FIG. 4 is a diagram illustrating RGB sensor support chip in measuring RGB content of LED light source, according to some embodiments.

According to some embodiments, the combination of the environment sensor and the color sensor, may be set into one of a single ASIC or a set of separate devices, all of which may also be connected to a gateway such as gateway 102. In some embodiments, the sensors may be directed as follows: the color sensor faces a luminaire and the environment sensor faces away from the luminaire in such a way that the environment sensor monitors the environment. Real time measurements and assessments may be conveyed to a gateway by the sensors that make up a sensor subsystem such as sensor subsystem 108. The ASIC chip may be designed to support a RGB/color sensor (GSC2) in measuring RGB content of LED light source. The RGB/color sensor (GSC2) may interface to environment sensor (GSC1) and supply RGB analog signals. The RGB/color sensor (GSC2) may include an RGB sensor support chip for environment sensor (GSC1). The RGB/color sensor may include a highly configurable analog RGB sensor controlled through an I2C interface and a dedicated input. This input may be used to control the timing of the amplifiers and sampling circuit. The RGB/color sensor (GSC2) may include 3 built in integrating amplifiers, Power On Reset, Bias generator, buffered 3 bit DAC and photodiodes with RGB filters. The RGB/color sensor (GSC2) may include two outputs OUTP and OUTN which represent the differential output from the selected R, G or B channel. In some embodiments, the two outputs may include analog outputs. The ASIC chip may include area programmable Red, Green and Blue photodiodes connected to an integrating amplifier as illustrated in FIG. 4. Having three parallel signal paths may make it possible to simultaneously integrate a current from the RGB channels. This may ensure that a sampling time is the same for both R, G and B and thereby the ratio between the different channels may be as accurate as possible which may be important for color temperature calculations (calibration is needed to get the correct ratios). The "CTRL" input may be used by a digital state machine to generate a timing control of the integrating amplifiers. A Voltage Reference circuit may supply the 3-bit DAC circuit with a stable reference voltage. The POR circuit may ensure that a digital circuit is reset and defined during power up and in case the power drops.

Figure 5:
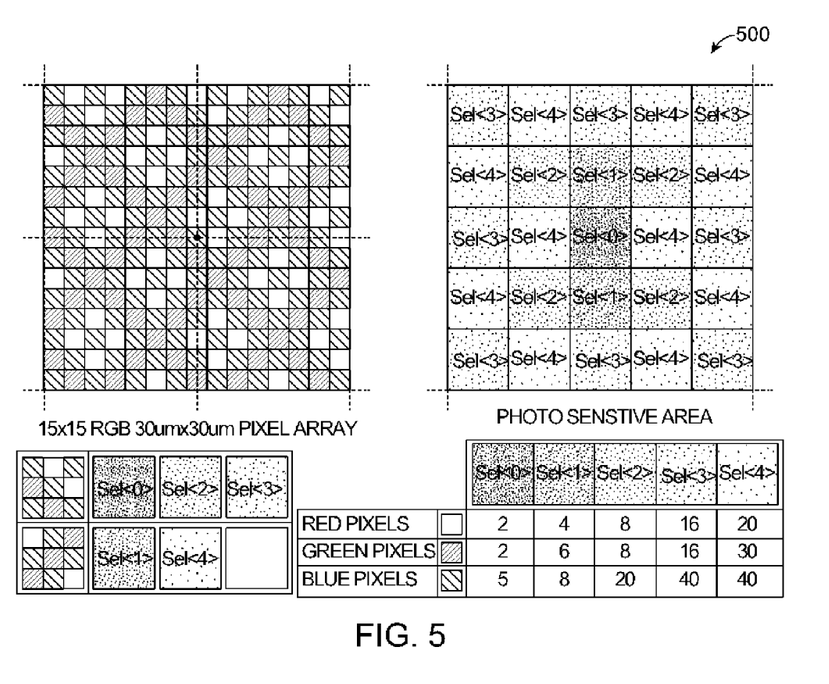
FIG. 5 is a diagram illustrating distribution of RGB pixels in the photo sensitive area of the chip according to some embodiments.

The RGB pixel array may be used to measure both the RGB content of a light source and luminous flux. RGB filters and IR cut filters may be post-processed on the photodiodes. A distribution of RGB pixels in the photo sensitive area of the chip 500 is illustrated in FIG. 5 according to some embodiments. In some embodiments, the RGB pixel array may include 15×15 photodiodes where a pixel size may include 30 µm×30 µm with a fill factor of around 75%. Each pixel in the pixel array may include a built-in transmission gate which may be controlled by the digital core. The light source may be physically in close proximity to the RGB sensor chip. Therefore, the light intensity incident on the photodiodes might be unevenly distributed. To overcome this issue of uneven distribution, the RGB pixel array may be mixed in a certain pattern as shown in top left of FIG. 5. Due to variations in the luminous flux of different light sources, and uncertainty in the placement of the RGB/color sensor (GSC2) with respect to the light source, the photodiode may be subject to a varying amount of illumination. To cope with this wide dynamic range a programmable number of RGB photodiodes may be multiplexed together. This may add one more degree of freedom in addition to integration time and integration capacitance in the integrating amplifier. Furthermore, the sensitivity of the photodiodes covered with blue filters may be less than the sensitivity of red and green photodiodes. For example, in some embodiments, the blue filters may be smaller by a factor of three. Therefore the number of photodiodes covered with a blue filter may be larger than red and green photodiodes. In some embodiments, a factor of 2.5 may be used to provide a reasonable permutation between Red, Green and Blue pixels.

According to some embodiments, the environment and color sensors of the sensor subsystem 108 may be placed or connected on a fitting of a luminaire. The exact location of the sensors may not be fixed (e.g., two different luminaires by a same manufacturer of a same type of fitting and LED specifications may be assembled such that the sensor location is different relative to the surface and dimensions of the fitting). The location of the color and environment sensors on the fitting may not be limited.

Figure 6:
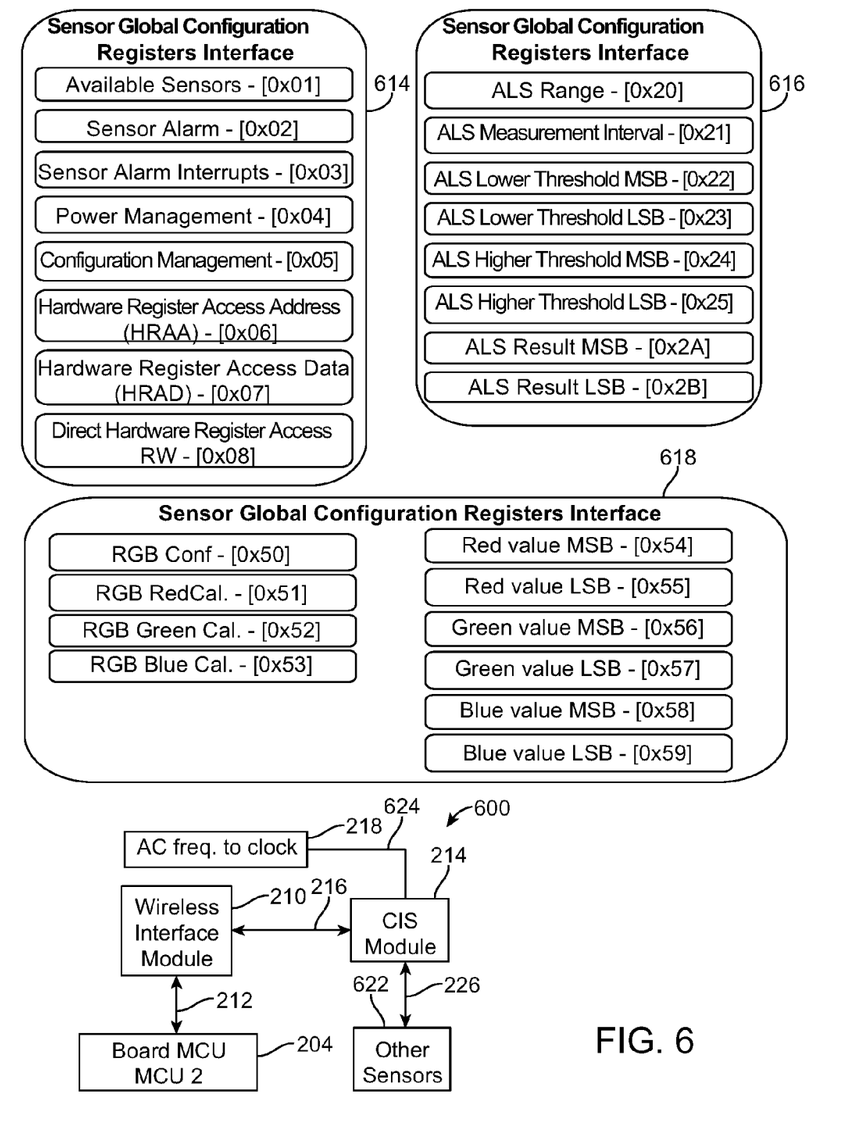
FIG. 6 is a diagram illustrating a type of information/data structure that is receivable by a sensor interface of a system, according to some embodiments.
Figure 7:
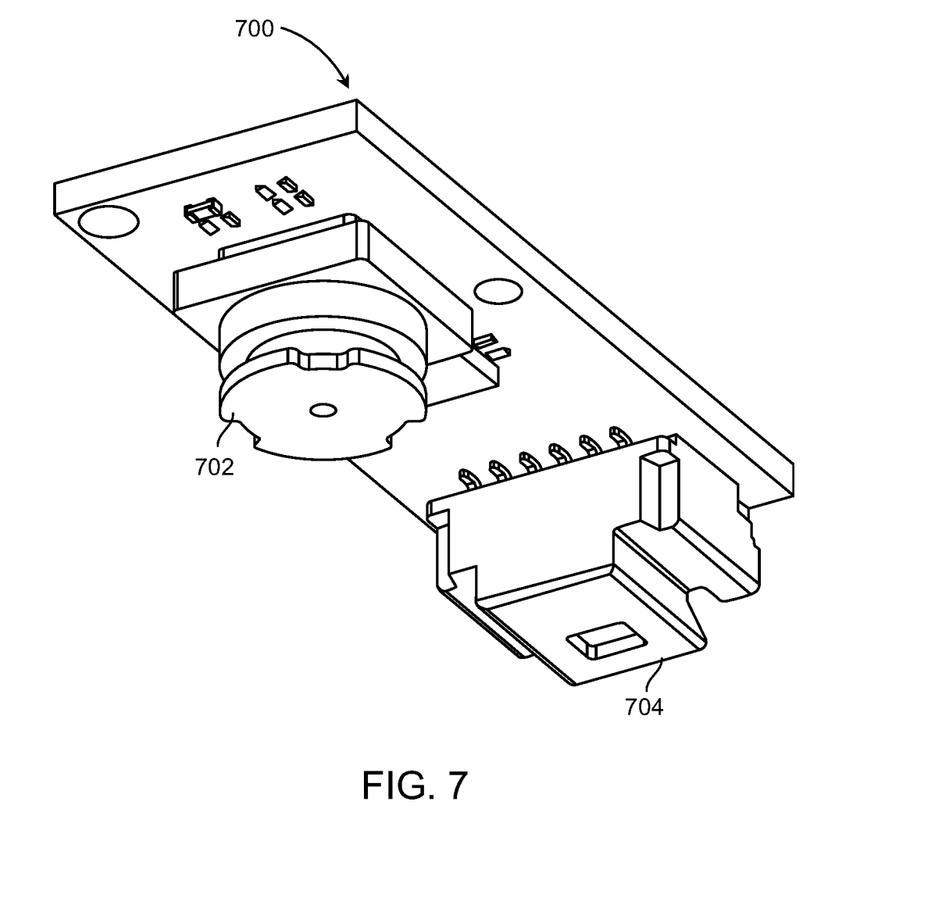
FIG. 7 illustrates a rear perspective view of the sensor board for luminaire/lighting system, according to some embodiments.
Figure 8:
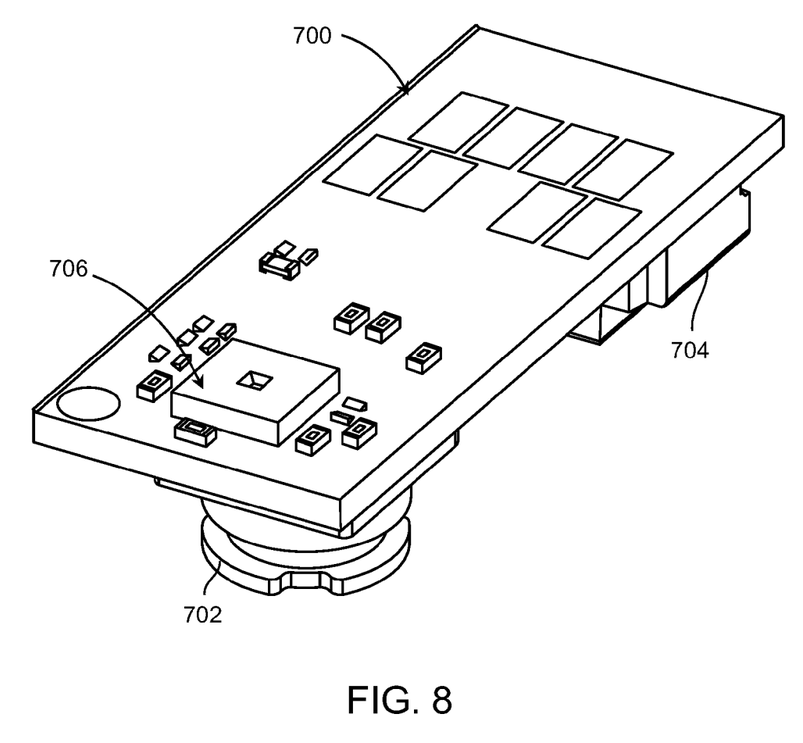
FIG. 8 illustrates a top perspective view of the sensor board for luminaire/lighting system, according to some embodiments.
Figure 9:
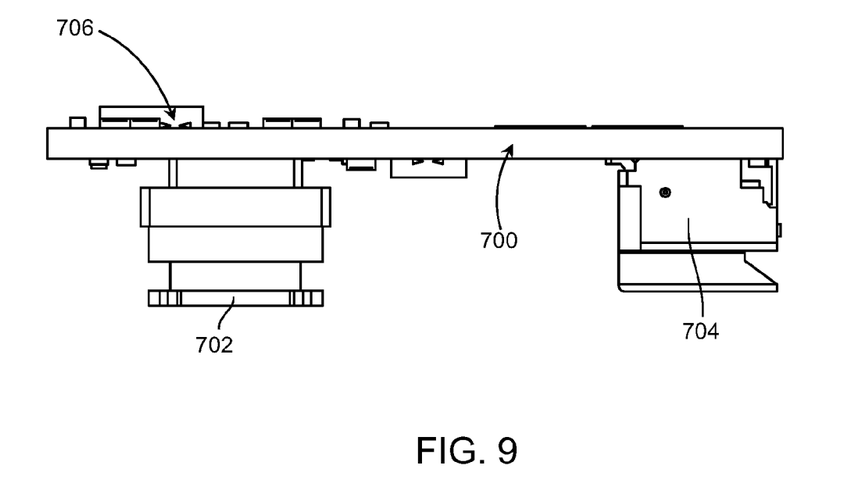
FIG. 9 illustrated a side view of the sensor board for luminaire/lighting system, according to some embodiments.

FIG. 6 illustrates an embodiment of a sensor interface data structure 600. According to some embodiments, a sensor interface may include a Two-Wire Serial Interface (TWSI) 216 that allows the use of memory mapped registers to communicate information between the wireless interface module (WIM) or gateway and a CIS module such as CIS module 214. In turn, the wireless interface module (WIM) or gateway may provide information and receive directives from a Board MCU-MCU 2 such as board 204 via a SPI bus such as bus 212. As illustrated in FIG. 6, and according to some embodiments, the sensor devices 600 may include multiple registers associated with any/all of its functions. In some embodiments, an interface 216, 226 with the sensor device is an array of eight bit (8-bit) registers (see, for instance, Sensor Global Configuration Register Interfaces 614 and 616). Each register may be mapped to a specific memory address on the wireless interface module (WIM) or gateway 210. In some embodiments, a plurality of interfaces 614, 616, 618 may be provided to control the sensors 600. In the exemplary embodiment of FIG. 6, an example of a register, such as a Sensor Global Configuration Register Interface 614 is illustrated. The Sensor Global Configuration Register Interface 614 may be set as follows: the register in address 0x01 may turn on bits associated with available sensors on the module. If a sensor does not exist, its bit may be set to 0. Available sensors in this embodiment may be: Ambient Light Sensor ("ALS"), Motion detection based on PIR ("PIR"), RGB sensor ("RGB"), Motion detection and direction based on frame capture ("MOT"), LED Lumen sensor ("LL"), and Temperature sensor ("TEMP"). According to some embodiments, the register address 0x02 may be used as an alarm for the different sensors (e.g., one can set the value range so that when reached by the specific sensor the appropriate alarm bit in this register will turn to 1, or else it is 0). The register in address 0x03 may be used for resetting sensor alarms when this occurs. According to some embodiments, the register in address 0x04 is used to power ON and/or OFF the entire sensors' system. The register in address 0x05 may be used for configuration management. Typical registers can be found in register addresses found in 0x06-0x08, as well as 0x20-0x28 and 0x50-0x59. These are merely examples, as one of ordinary skill in the art would understand—additional sensors would expand (or constrict) the registers.

FIG. 7, FIG. 8, FIG. 9 and FIG. 10 illustrate an embodiment of a sensor board 700 that includes multiple sensors, an interface and a communication gateway. In some embodiments, the sensor board 700 may include an environment sensor 702 on a first side of the sensor board, and a RGB color sensor 706 on a second side of the sensor board. The environment sensor 702 and the RGB color sensor 706 may be oriented 180° apart from each other accommodated in the sensor, thereby enabling upward and downward functionality of the sensors respectively. In one embodiment, the orientation of the environment sensor 702 may be configured to limit light being incident from the luminaire to eliminate false ambient light readings. In another embodiment, the orientation of the RGB color sensor 706 may be configured to receive direct light from the luminaire.

In one embodiment, the environment sensor 702 may be configured to face downward and away from the luminaire/lighting system. In another embodiment, the RGB color sensor 706 may be configured to face upward and towards the luminaire/lighting system. In one embodiment, the environment sensor 702 may include an adjustable lens assembly, thereby configured to a pre-defined field of view. In some embodiments, the sensor board 700 may further include one or more supporting components and a connector housing 704.

Figure 10:
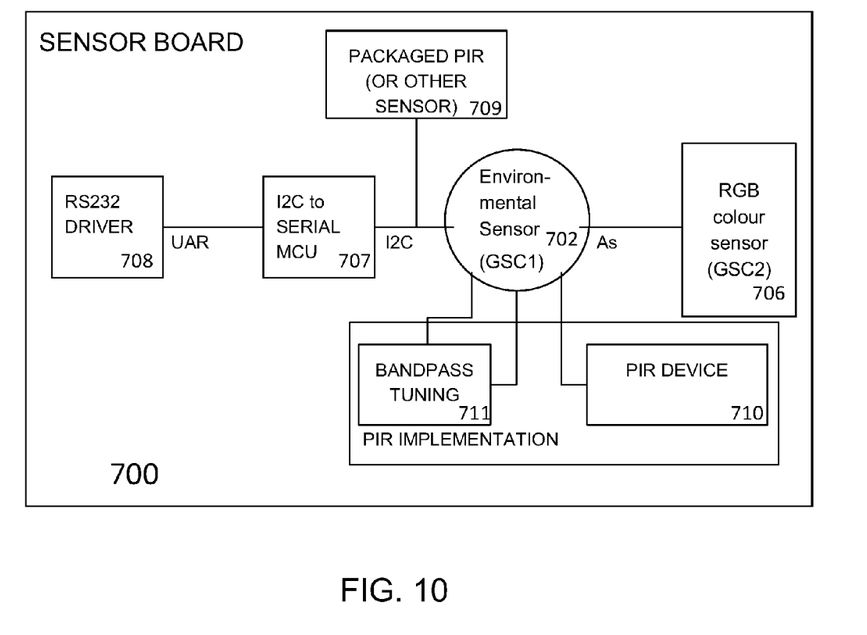
FIG. 10 illustrates a block diagram of the sensor board incorporated in the luminaire, according to some embodiments.

The environment sensor 702 and the RGB color sensor 706 may be connected via an actuator sensor (AS) interface (as will later be described with respect to FIG. 10). The environment sensor 702 and the RGB color sensor 706 may be connected to a microcontroller unit (e.g., I2C to serial MCU) 707 via an inter-integrated circuit interface (I2C), to receive one or more sensed data from the sensors. Further, the microcontroller unit (I2C to serial MCU) 707 may be connected to an external communication gateway (e.g., RS232 USB driver) 708 via a Universal Asynchronous Receiver/Transmitter (UART) interface to communicate the sensed data from the sensors. In some embodiments, the sensor board 700 may include one or more additional slave devices/sensors 709 that are connected to the microcontroller unit (I2C to serial MCU) 707 via the inter-integrated circuit interface (I2C), thereby receiving the sensed data from the additional/auxiliary sensors. In some embodiments, the additional sensors 709 including one or more light ambient sensors, PIR sensors, temperature sensors, image sensors or barometric sensors.

In some embodiments, the sensor board 700 further includes a capability of integrating with multiple sensors such as a PIR sensor 710. In some embodiments, the sensor board 700 further includes a drain and a smoothing circuit, wherein the circuit is configured to allow direct connection for a three pin PIR sensor. The sensor board 700 may further include an external bandpass filter resistors and capacitors 711 configured to allow bandpass configuration of two AC coupled amplifiers integrated into the ASIC.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A sensor board for use with a luminaire, the sensor board comprising:
   an environment sensor disposed on a first side of the sensor board to function in a first direction; and
   a color sensor disposed on a second side of the sensor board to function in a second direction,
   wherein the environment sensor and the color sensor are oriented 180° apart from each other on the sensor board, the first direction is oriented 180° apart from the second direction, and the environment sensor comprises an adjustable lens assembly to set a predefined field of view.

2. The sensor board of claim 1, wherein the environment sensor is configured to face away from a luminaire.

3. The sensor board of claim 2, wherein the color sensor is configured to face towards the luminaire.

4. The sensor board of claim 1, wherein the color sensor comprises an RGB pixel array to measure both an RGB content of a luminaire and a luminous flux of the luminaire, wherein the RGB pixel array is disposed on a photo sensitive area of a chip and each pixel in the RGB pixel array comprises a built-in transmission gate.

5. The sensor board of claim 1, wherein the environment sensor and the color sensor are connected to a microcontroller unit via an inter-integrated circuit interface.

6. The sensor board of claim 1, wherein an orientation of the environment sensor is configured to limit light being incident from the luminaire to eliminate false ambient light readings.

7. The sensor board of claim 1, wherein an orientation of the RGB color sensor is configured to receive direct light from the luminaire.

8. A sensor board for use with a luminaire, the sensor board comprising:
   a camera disposed on a first side of the sensor board and facing away from a luminaire; and
   a color sensor disposed on a second side of the sensor board to face towards the luminaire,
   wherein the camera and the color sensor are oriented 180° apart from each other on the sensor board, a direction of the camera is oriented 180° apart from a direction of the color sensor, and the camera comprises an adjustable lens assembly to set a predefined field of view.

9. The sensor board of claim 8, wherein the color sensor comprises an RGB pixel array to measure both an RGB content of a luminaire and a luminous flux of the luminaire, wherein the RGB pixel array is disposed on a photo sensitive area of a chip and each pixel in the RGB pixel array comprises a built-in transmission gate.

10. The sensor board of claim 8, wherein the camera and the RGB color sensor are connected via an actuator sensor interface.

11. The sensor board of claim 8, wherein the camera and the RGB color sensor are connected to a microcontroller unit via an inter-integrated circuit interface.

12. The sensor board of claim 8, wherein an orientation of the camera is configured to limit light being incident from the luminaire to eliminate false ambient light readings and an orientation of the RGB color sensor is configured to receive direct light from the luminaire.

13. A sensor board for use with a luminaire, the sensor board comprising:
   an environment sensor disposed on a first side of the sensor board to function in a first direction; and
   an RGB color sensor disposed on a second side of the sensor board to function in a second direction,
   wherein the environment sensor and the RGB color sensor are oriented 180° apart from each other on the sensor board, the first direction is oriented 180° apart from the second direction, and the environment sensor comprises an adjustable lens assembly to set a predefined field of view.

14. The sensor board of claim 13, wherein the RGB color sensor comprises an RGB pixel array to measure both an RGB content of a luminaire and a luminous flux of the luminaire.

15. The sensor board of claim 14, wherein the RGB pixel array is disposed on a photo sensitive area of a chip.

16. The sensor board of claim 14, wherein the RGB pixel array comprises 15×15 photodiodes with a pixel size of 30 μm×30 μm.

17. The sensor board of claim 14, wherein each pixel in the RGB pixel array comprises a built-in transmission gate.

18. The sensor board of claim 14, wherein the RGB pixel array comprises a plurality of red filter covered photodiodes, green filter covered photodiodes, and blue filter covered photodiodes.

19. The sensor board of claim 18, wherein a sensitivity of the blue filter covered photodiodes is less than a sensitivity of the red filter covered photodiodes and a sensitivity of the green filter covered photodiodes.

20. The sensor board of claim 18, wherein a number of blue filter covered photodiodes in the RGB pixel array is larger than a number of red filter covered photodiodes and green filter covered photodiodes.

* * * * *